Aug. 28, 1923.

M. L. HUNKER 1,466.170

SAFETY MECHANISM FOR POWER PRESSES

Filed May 21, 1921

INVENTOR.
M. L. Hunker
BY
ATTORNEY.

Aug. 28, 1923.

M. L. HUNKER 1,466,170

SAFETY MECHANISM FOR POWER PRESSES

Filed May 21, 1921

INVENTOR
M. L. Hunker
BY
ATTORNEY

Aug. 28, 1923.

M. L. HUNKER 1,466,170

SAFETY MECHANISM FOR POWER PRESSES

Filed May 21, 1921

INVENTOR
M. L. Hunker.
BY
ATTORNEY

Aug. 28, 1923.

M. L. HUNKER 1,466,170

SAFETY MECHANISM FOR POWER PRESSES

Filed May 21, 1921 7 Sheets-Sheet 7

INVENTOR
M. L. Hunker.
BY
H. E. Dunlap
ATTORNEY

Patented Aug. 28, 1923.

1,466,170

UNITED STATES PATENT OFFICE.

MARTIN L. HUNKER, OF WHEELING, WEST VIRGINIA.

SAFETY MECHANISM FOR POWER PRESSES.

Application filed May 21, 1921. Serial No. 471,388.

*To all whom it may concern:*

Be it known that I, MARTIN L. HUNKER, a citizen of the United States of America, and resident of Wheeling, county of Ohio, and State of West Virginia, have invented certain new and useful Improvements in Safety Mechanisms for Power Presses, of which the following is a specification.

This invention relates broadly to power presses, and more particularly to safety mechanism for power presses of hand-fed types.

The primary object of the invention is to provide a safety clutch mechanism for power presses, the same embodying means whereby the production of a second, or repeat, stroke or reciprocation of the press slide following actuation is positively prevented.

A further object is to provide mechanism, including a hand-contacting element or guard, whereby the press is instantly stopped at any point in the downward stroke of its slide by contact of said guard with the hand of the operator, thus precluding the possibility of injury to the hand either through premature actuation of the press or through carelessness on the part of the operator.

With these and other important objects in view, the invention resides in certain novel features of construction and combination of elements which will hereinafter be fully described, it being understood that various structural changes within the scope of the appended claims may be resorted to without departing from the spirit of the invention.

In the accompanying drawings, in which a preferred form of the invention is illustrated—

Referring to said drawings, 1 indicates the frame, 2 the bed, 3 the reciprocable slide, 4 the crank shaft, and 5 the drive wheel of a power press, said parts, generally considered, being of any ordinary or preferred construction.

The drive wheel 5 is normally free to rotate on the crank shaft 4, but is adapted to be interlocked with the shaft for driving the latter through the intermediacy of a clutch mechanism which includes a longitudinally shiftable key 6 that is slidable in a channel or keyway 7 provided therefor in said shaft, a recess or socket 8 for the reception of an end of said key being provided in the hub of said wheel.

A disk 9, hereinafter termed a clutch-disk, is carried upon and in fixed relation to the crank shaft 4 adjacent to the hub of the drive wheel 5, and provided in said clutch-disk is a keyway 10 corresponding to, or matching, the keyway 7 in said shaft and having a portion of the key 6 permanently received therein. Mounted upon the crank shaft against the inner face of the clutch-disk is the outer face of a peripherally toothed wheel or disk 11, hereinafter termed a ratchet-disk; and fixed upon said crank shaft against the inner face of said ratchet disk 11 is a collar 12 having a socket 13 extending thereinto through its outer face and disposed in register with the keyway 7 of the shaft. Slidably received within said socket 13 is the inner end, or head portion, 6ª of the key 6. Said collar has the socket 13 thereof of such greater depth than the distance throughout which the key 6 is shiftable for operatively engaging and disengaging the drive wheel 5 that said head portion of the key never becomes wholly withdrawn from said socket.

The clutch key 6 possesses a peculiar form, having an intermediate stem portion 6^b which is confined wholly to the keyway 7 in the crank shaft, the head portion 6^a hereinbefore referred to as received within the socket 13 of the collar 12, and a front end portion 6^c having a part thereof extending radially from said keyway.

In the advanced position of the key, the front end portion 6^c thereof is projected into the socket 8 of the hub of the drive wheel and effects interlocking of the shaft with the latter; and when the key is retracted, the radially extending part of said end portion 6^c is wholly received within the keyway 10 of the clutch disk 9. In the advanced, or shaft-driving, position of the key, the head portion 6^a thereof extends outward from the socket 13 of collar 12 into an aperture or keyway 14 provided therefor in the ratchet disk 11; and in the retracted position of said key, said head 6^a is withdrawn from said keyway 14. The stem portion 6^b at no time projects into a position interfering with rotary movement of the ratchet disk with respect to the shaft.

Figure 3:
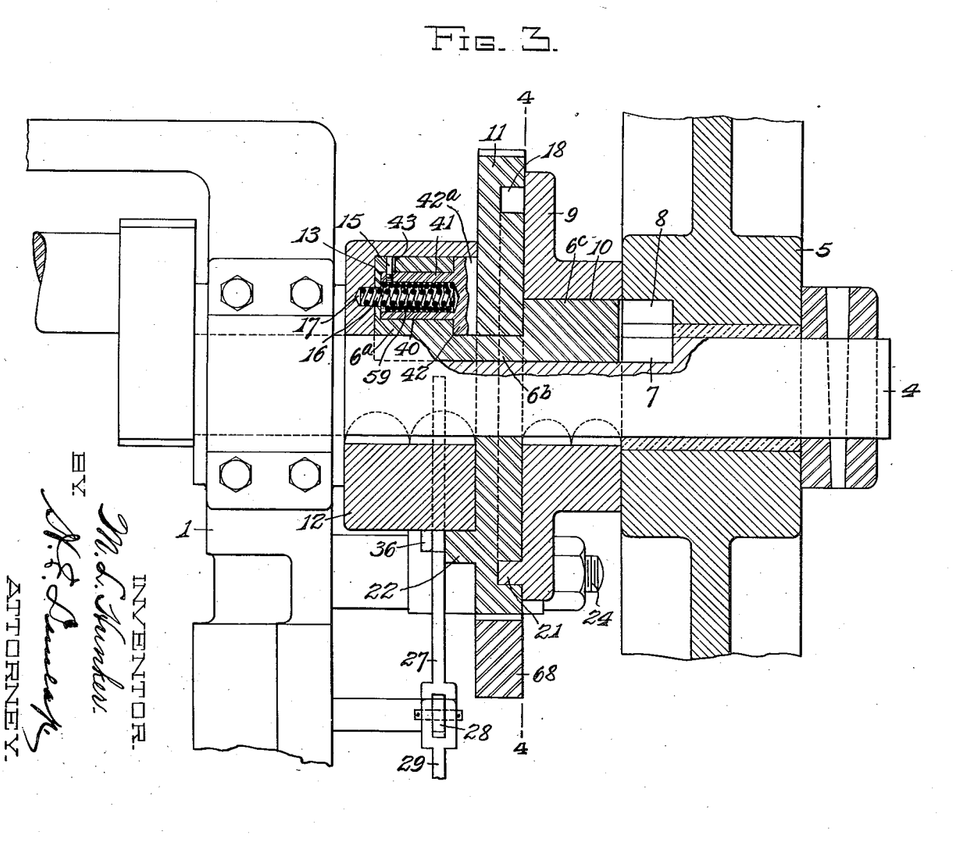
Figure 3 is an enlarged longitudinal section of the clutch mechanism.

Provided in the head 6^a of the clutch key is a socket 40, the same leading through the outwardly facing end portion of said head, and loosely fitted within said socket is a hollow stem 41 formed on a block 42 which seats against said end and which has its outer face 42^a, or that face which is presented to the ratchet disk 11, inclined or beveled for a purpose which will hereinafter be made apparent. A pin 15 fixed in the side of the hollow stem 41 projects outward through a hole 43 in the head 6^a, said hole being of a size slightly larger than said pin to permit slight relative movement of the block 42 with respect to the key head. Disposed longitudinally within the bore of said stem 41 is a spiral compression spring 16 which extends outward through the end of the head 6^a into a socket 17 provided therefor in the collar 12 at the inner end of the socket 13. Said spring constitutes the actuating means whereby the key 6 is thrust to its advanced, or operative, position when such movement is permitted, as will hereinafter be explained. A spiral compression spring 59 is disposed within the hollow of stem 41 in encircling relation to the spring 16, the same having one end seated at the end or bottom of said socket 40 and having its opposite end seated at the end of the bore of said stem. Said spring 59 maintains the key 6, when the latter is retracted, in a position wherein its outer end is wholly disengaged from the drive wheel, as shown in Fig. 3, for preventing the objectionable chatter or clicking which would otherwise result during rotation of said wheel.

Figure 1:
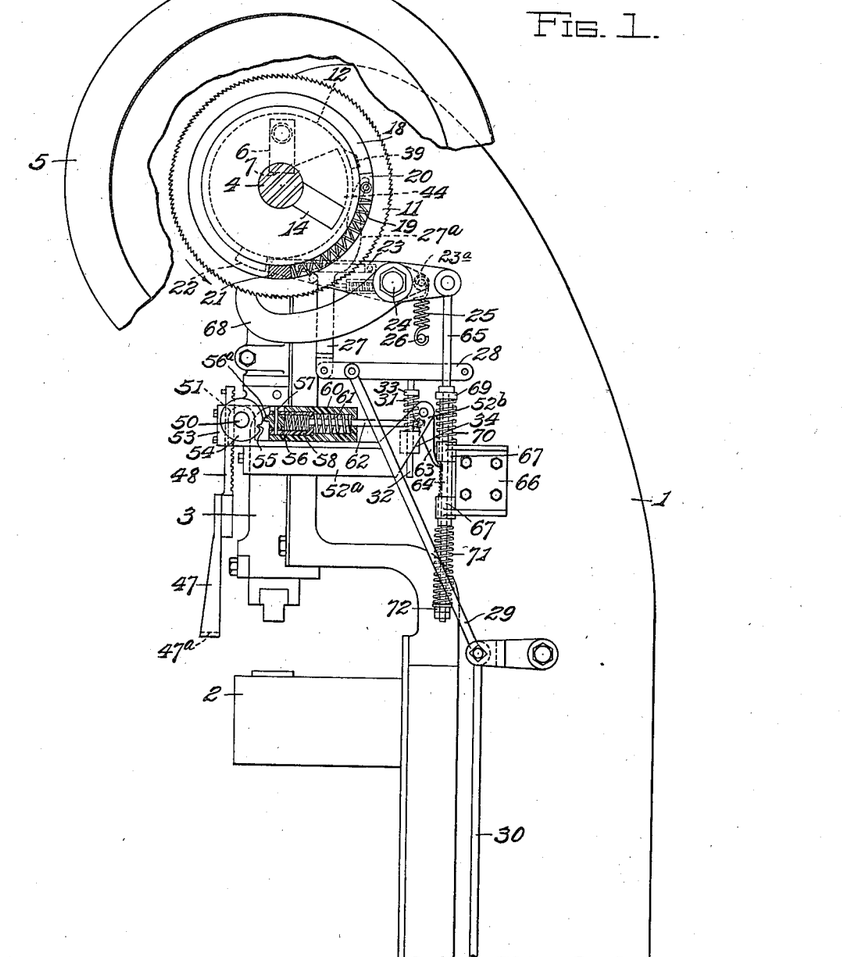
Figure 1 is a partial sectional elevation of a power press embodying my invention.
Figure 2:
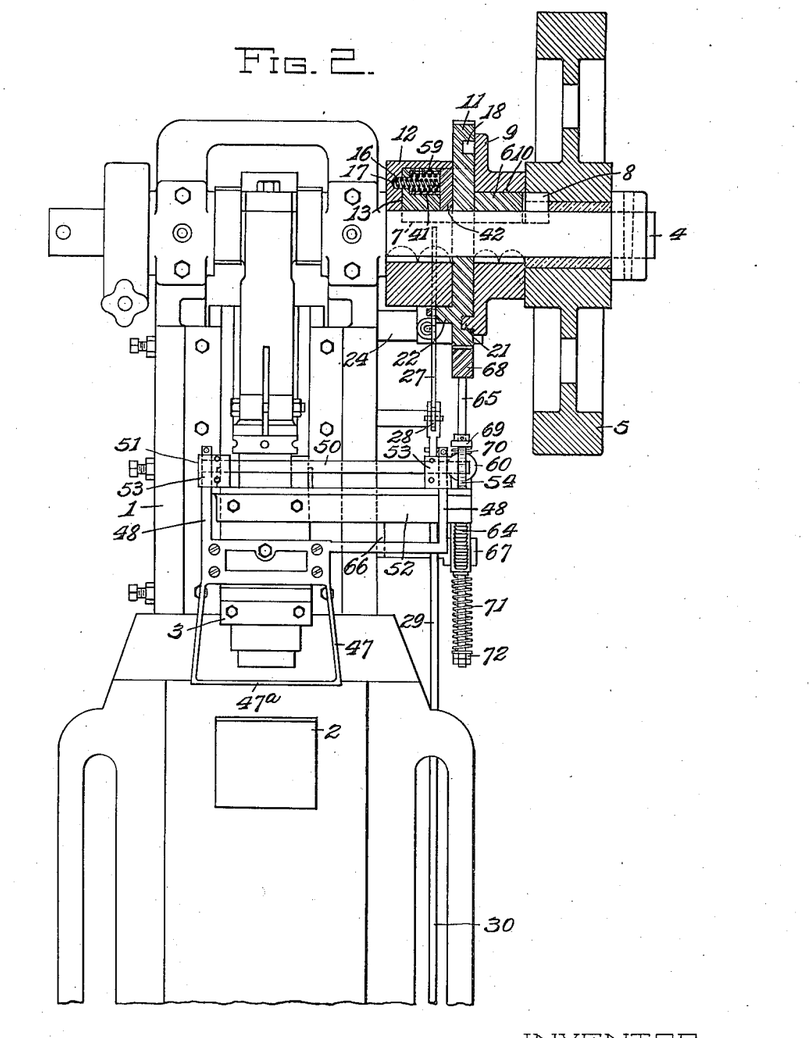
Figure 2 is a front elevation of the same with the clutch mechanism illustrated in section.
Figures 4, 5, 6:
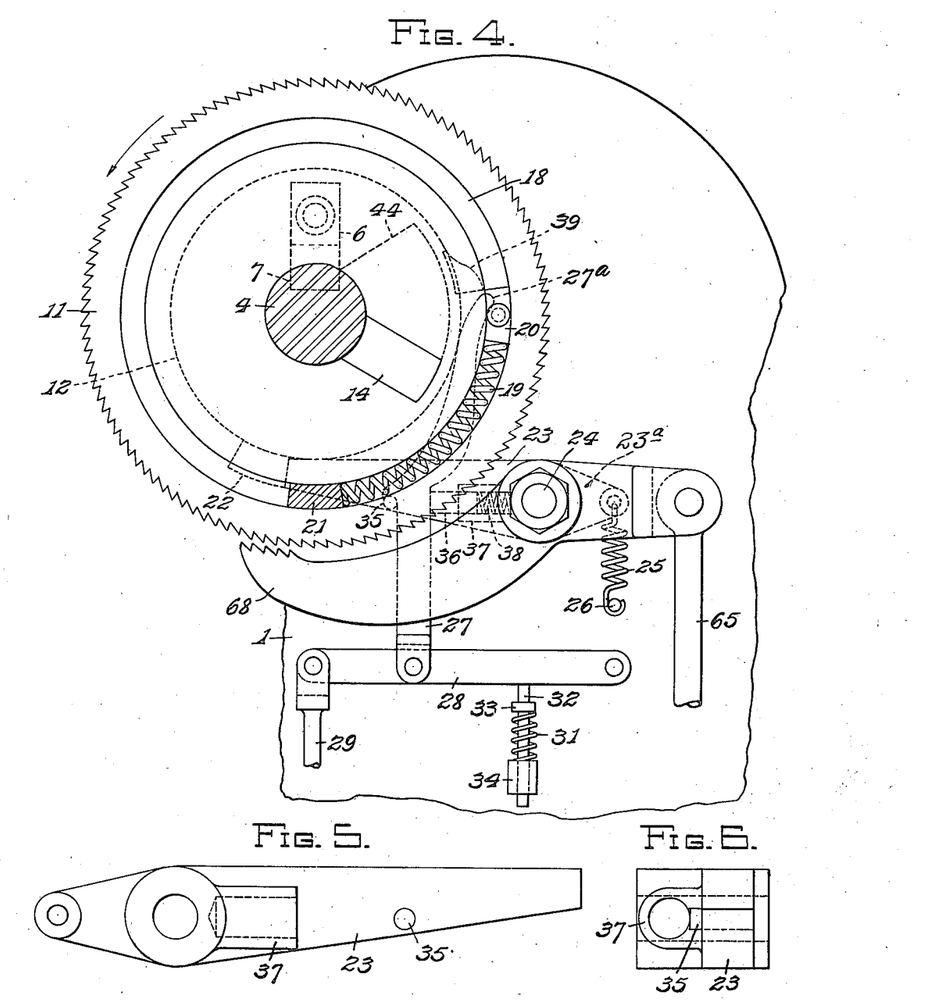
Figure 4 is an enlarged sectional elevation of said clutch mechanism with the parts occupying their at-rest positions, the section being taken on line 4—4, Fig. 3.
Figure 5 is an enlarged inner face elevation of the knock-out lever.
Figure 6 is a front end elevation of the same.

Provided in the outer face of the ratchet disk 11 and located concentrically with respect to the axis of said disk is a groove or channel 18 in which is disposed a spiral compression spring 19. One end of said spring is attached to a block 20 which is stationarily disposed within the channel 18, while the opposite end thereof rests against a lug 21 which projects into said channel from the adjacent face of the clutch disk 9. In the normal position of the parts, the ratchet disk 11 is maintained by said spring 19 in a position in which the aperture or keyway 14 thereof is disposed wholly out of register with the keyway 7 of the shaft, as is best shown in Figs. 1, 2 and 4, maintaining the key 6 in its retracted or inoperative position. In said position, a lug 22 carried on the inner face of said ratchet disk abuts the free end of a lever 23 which occupies a substantially horizontal position and which is pivoted intermediate its ends upon a stud bolt 24 carried on the adjacent side of the press frame 1, said lever being normally held in a position in which its end may be so abutted by means of a retractile coil spring 25 attached at one end to a fixed part of said frame, as to a stud or post 26, and attached at its opposite end to the outer end 23^a of said lever.

Figure 7:
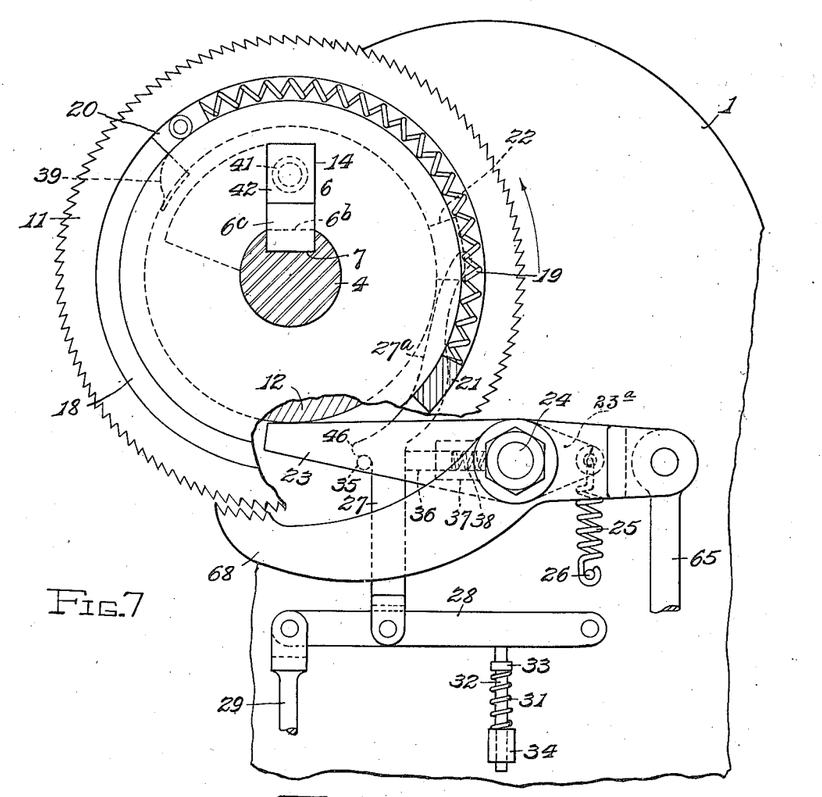
Figure 7 is a view similar to Fig. 4 showing the parts in operating positions.
Figure 8:
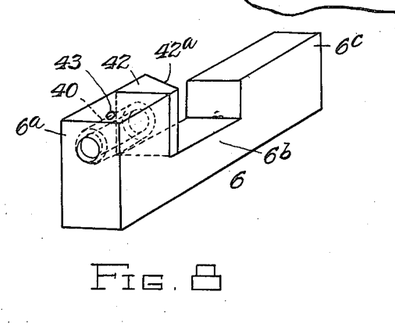
Figure 8 is a detail perspective view of the clutch-key.

A substantially upright safety finger 27 has its lower end pivotally mounted upon a substantially horizontal lever 28 which has one end pivotally mounted on the side of the frame 1 and which is operatively connected, as by jointed rods 29 and 30, with the usual depressible treadle (not shown), the connection of said rod 29 with said lever 28 being either intermediate the ends, as shown in Fig. 1, or at the free end of the lever, as shown in Figs. 4 and 7.

The lever 28 and the thereby-carried parts are normally held in their elevated inoperative positions by suitable means, as by a spring 31 carried by a rod 32 which has its upper end in underlying supporting relation to said lever, said spring being interposed between a collar 33 carried by said rod and a fixed sleeve-like member 34 through which said rod is vertically movable.

The safety finger 27 is normally held in an upright position between a fixed stud 35 carried on the inner face of the lever 23, hereinafter termed a knock-out lever, and a thrust-pin 36 which is slidably mounted in a socket-piece 37 formed on said lever, a spring 38 disposed in said socket-piece exerting a tension whereby said thrust-pin is held seated against said finger for yieldingly holding the latter in abutting relation to said stud 35. Said safety finger has a nose-like projection 46 which overhangs said stud 35, so that, when the finger is actuated to move downward through depression of the treadle, it draws downwardly therewith the free end of the knock-out lever 23 for disengaging the lug 22 of the ratchet disk 11. The upper end portion 27ª of said finger has a curved form and normally lies against or closely adjacent to the periphery of the collar 12 in the path of rotation of a lug 39 formed on said collar. Said lug is designed to engage said finger near the end of each revolution of the shaft and to thrust said finger rearward against the tension of spring 38 a sufficient distance to permit the knock-out lever 23 to return, if it has not already done so, to its elevated position in which its end is engaged by the lug 22 of the ratchet disk for stopping the latter at the completion of its single revolution. As is apparent, the knock-out lever is permitted to return to its elevated operative position as the safety finger is elevated following release of the treadle. But, if for any reason the finger should not promptly resume its normal elevated position, as when the treadle is held depressed following actuation of the clutch, the lug 39 will thrust said finger outward a sufficient distance to withdraw the projection 46 of said finger from engagement with the stud 35 of the knock-out lever, thus releasing said lever and allowing the same to resume its operative position. Thus provision is made for positively preventing a second successive revolution of the shaft which would result in imparting to the press slide 3 a second, or repeat, stroke.

Figure 9:
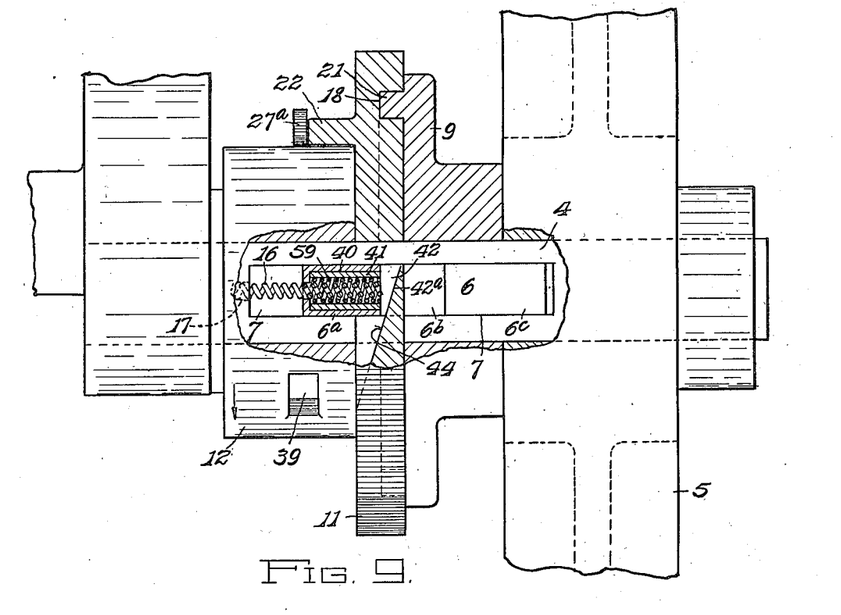
Figure 9 is a partial longitudinal section of the clutch mechanism, said section being taken at right angles to the section in Fig. 3.
Figure 10:
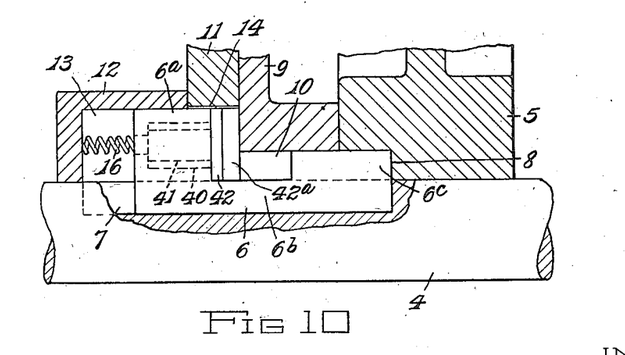
Figure 10 is a fragmentary detail section showing the clutch key in locking position.
Figure 11:
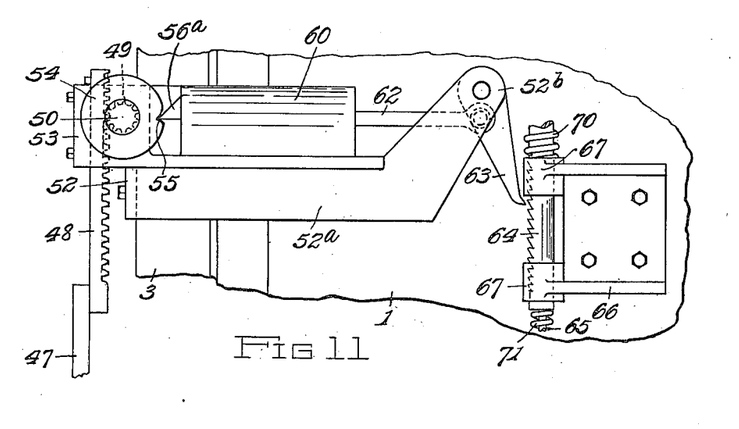
Figure 11 is an enlarged side elevation of parts of the trip mechanism.
Figure 12:
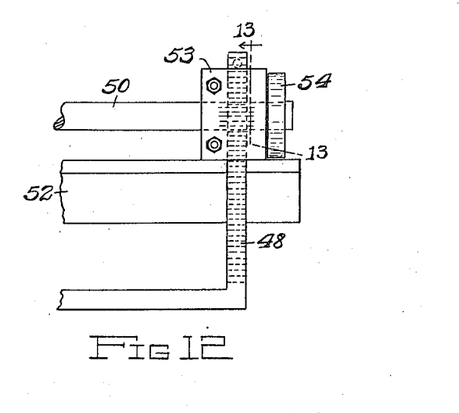
Figure 12 is a fragmentary detail view in front elevation of the cam-operating portion of the trip mechanism; and—
Figure 13:
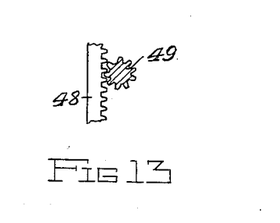
Figure 13 is a detail section taken substantially on line 13—13, Fig. 12.

From the foregoing it will be understood that, when the parts occupy the normal positions shown in Figs. 1 and 7 and the treadle is depressed, the lever 23 will be drawn downward through the medium of the intermediate parts, disengaging the lug 22 of the ratchet disk 11, whereupon, actuated by the spring 19 compressed between the block 20 of said disk and the lug 21 of the clutch disk 9, said ratchet disk is promptly rotated forward throughout a portion of a revolution, or throughout the distance necessary to carry the keyway 14 thereof into register with the keyway 7 of the shaft. A gradually inclined or beveled surface 44 leads inward from the inner face of the ratchet disk to said keyway 14, as is best illustrated in Fig. 9, and this bevel cooperates with the similarly inclined outwardly facing surface 42ª provided, as aforesaid, on the block 42 carried by the key 6, for allowing said key to gradually move outward to its operative position, impelled by the spring 16, as the ratchet disk is moved into the position wherein the keyway thereof registers with that of the shaft, as aforesaid.

When the key 6 has assumed its operative position with its outer end in the socket 8 of the drive wheel 5, the shaft 4 and the parts carried thereby are actuated to rotate with said wheel throughout a single revolution for producing a complete reciprocation of the press slide 3.

Near the end of each revolution of the shaft, the lug 22 of the ratchet disk strikes the end of the knock-out lever 23, resulting in said disk being stopped instantly. However, the shaft will continue to rotate throughout the short distance required to withdraw the key 6 from interlocking relation to the drive wheel. This withdrawal of the key is promptly effected through the relative sliding of the inclined face 42ª of the wedge-block 42 of said key upon the bevel 44 of the then stationary ratchet disk, as will be understood from inspection of Fig. 9 of the drawings.

To provide means whereby the clutch mechanism hereinbefore described may be instantly rendered inoperative, or disengaged, for automatically stopping the downward movement of the press slide 3 at any point in the travel of the latter prior to the withdrawal of the hand or hands of the operator from beneath the slide, safety mechanism including a tripping device or guard is disposed for actuation through contact of said guard with a hand in the feed passage to instantly and positively stop rotary movement of the ratchet disk 11. Said tripping device or guard may be of any suitable form, but, as herein shown, comprises a substantially rectangular vertically-disposed frame 47 having a lower horizontal member 47ª which occupies a position in front of and below the level of the head of the press slide 3. Said frame has two upright parallel arms 48 of toothed rack-bar form disposed in mesh with pinions 49 fixed upon or formed in a horizontal shaft 50 which is journaled in bearings 51 mounted upon or carried by a horizontal bracket 52 that is bolted to the press slide 3. Said rack-bars 48 are held to the pinions 49 and are guided by face plates 53 attached to the bearings 51, as shown.

Carried upon one end of the shaft 50 is a disk or cam 54 having a recess 55 in the periphery thereof. In the normal position of the shaft, the recess 55 of said cam 54 has received therein the projecting spur-like nose 56ª of a detent 56 which is rigidly secured by means of a pin 57 within the outer end of a thimble 58. A casing 60 mounted upon a bracket arm 52ª located laterally of the press frame has said thimble 58 slidably mounted therein, the rear end of said thimble resting against an end of a compression spring 61 which has its opposite end seated at the rear end of said casing, said spring acting to normally maintain said thimble in a forwardly thrust position. A rod 62 attached to the inner end of said thimble extends outward through the rear end of the casing 60 and is pivotally attached to a pawl or dog 63 which is pivotally mounted on a suitable support, as upon an upwardly directed extension 52ᵇ of the bracket arm 52ª. As is obvious, in the said forwardly thrust position of the thimble, the dog 63 is held in a retracted inoperative position. However, when the thimble is thrust rearward through movement of the cam 54 to a position wherein the detent nose 56ª is forced from the recess 55 of the cam, the dog 63 is swung rearward to a position in which its point engages a tooth of a rack-bar 64 which is vertically movable in sleeve-like guides 67 carried by a bracket 66 fixed on the press frame. Said rack-bar 64 is slidably disposed upon a vertical rod 65 which has its upper end pivotally attached to an end of a dog or pawl 68 that is pivoted intermediate its ends upon the stud bolt 24. Interposed between the upper of the guides 67 and a collar 69 carried on the upper end of the rack-bar is a supporting spring 70 whereby said rack-bar and the rod 65 are normally maintained in an elevated position for holding said pawl 68 withdrawn from engagement with the ratchet disk 11. A light rod-encircling spiral spring 71 is interposed between the lower end of the rack-bar 64 and an adjusting nut 72 carried on the lower end of said rod 65, said spring being designed, when the rack-bar is lowered, to actuate the rod 65 to move downward for swinging the pawl 68 into a position wherein its teeth engage the adjacent teeth of the ratchet disk 11. As is obvious, said spring permits and compensates for any slight downward movement of the rack-bar beyond that required to engage said pawl with the ratchet disk.

When, in practice, the ram or slide 3 of the press is actuated through any cause to descend prior to the withdrawal of the hand of the operator from beneath the thereby-carried die, the lower horizontal member 47ª of the guard 47, which is carried by and travels with said slide, will engage such hand and its further downward movement will be instantly arrested. Since the descent of the slide continues following such arrest of the guard, the cam 54 is rotated slightly through the movement of the pinions 49 with respect to the rack-bars 48. Such slight rotation of the cam results, through the intermediate mechanism, in the dog 63 being swung rearward into operative relation to the rack-bar 64. The force required to actuate said dog is so slight as to be practically negligible; consequently, the force of the impact of the guard with the hand is very slight, or wholly insufficient to produce injury.

Continued movement of the slide 3 following engagement of the dog 63 with the rack-bar 64 actuates the latter downward the slight distance necessary to swing the pawl 68 into engagement with the ratchet disk 11, which results in instant arrest of said disk. Following such arrest, the crank shaft continues to rotate only throughout the small fractional part of a revolution necessary to effect retraction of the clutch key 6 from interlocking relation to the drive wheel 5, whereupon said drive wheel is permitted to continue its rotation independently of said shaft.

The engagement of the pawl 68 with the ratchet disk 11, resulting from contact of the guard 47 with the operator's hand, is practically coincident with such contact. Therefore, since but slight travel of the crank shaft relative to said disk is necessary to effect retraction of the key 6, the travel of the slide 3 following such contact is practically imperceptible, or so slight that injury to the hand beneath the die thereof is rendered impossible.

What is claimed is—

1. In a power press, a clutch including a ratchet disk and a key, said key being shiftable longitudinally to and from advanced shaft-interlocking relation to the driving means, a hand-guard arranged for travel with the press slide, and means intermediate said guard and said disk whereby travel of the latter is automatically arrested for disengaging said key from the driving means by impingement of said guard upon a member disposed in its path of travel, said arresting means including a pawl, shiftable means for moving said pawl into engagement with said disk, and a cam carried by the press slide and actuated by such impingement of the guard to operatively actuate said shiftable means.

2. In a power press, a clutch including a ratchet disk and a key, said key being shiftable longitudinally to and from advanced shaft-interlocking relation to the driving means, a hand-guard arranged for travel with the press slide, and means intermediate said guard and said disk whereby travel of the latter is automatically arrested for disengaging said key from the driving means by impingement of said guard upon a member disposed in its path of travel, said arresting means including a pivoted pawl normally disposed in inoperative relation to said disk, shiftable means connected to said pawl for actuating the latter into arresting relation to said disk, and a cam movable with the press slide and engageable with said shiftable means through such impingement of the guard whereby said shiftable means is actuated.

3. In a power press, the combination of a driving clutch embodying a longitudinally shiftable key and a ratchet disk, the latter, when rotation thereof is arrested, being adapted to effect shifting of said key to shaft-releasing position, a pivoted pawl operable into arresting relation to said disk, a resiliently mounted device connected to said pawl, a pivoted member movable with the press slide and engageable with said device, a guard carried by said slide, and means actuated by arrest of downward travel of the guard during the descent of the slide whereby said pivoted member is swung to a position interlocking said device with the slide for operatively actuating said pawl.

4. In a power press having a crank shaft, the combination with a driving clutch, of means operable into arresting relation to said clutch for effecting release of the crank shaft, a normally inactive device whereby said arresting means may be actuated, a hand-guard depending from and movable with the press slide, a cam rotatable through arrest of downward movement of said guard, and means intermediate said cam and said device whereby, when the former is rotated forward, the latter is interengaged with the slide for actuating said arresting means.

5. In a power press having a crank shaft, the combination with a driving clutch, of means operable into arresting relation to said clutch for effecting release of the crank shaft, a vertically movable rack-bar having connection with said arresting means, a dog carried by the press slide adjacent to said rack-bar, a hand-guard movable with the press slide, a cam rotatable through arrest of downward movement of said guard, and means intermediate said cam and said dog whereby, when the former is rotated forward, the latter is swung to a position interlocking said rack-bar with the slide for effecting movement of the latter to a position in which said arresting means is actuated.

6. A clutch mechanism for power presses, comprising a crank shaft having a longitudinal keyway therein, a drive wheel on said shaft, a key slidable in said keyway and adapted in its advanced position to interlock said shaft with said drive wheel, a ratchet disk carried by said shaft and having a limited range of rotary movement relative to the latter, said disk having a channel in its side, a fixed member in said channel, a clutch disk adjacent to said side and having a lug disposed in said channel, a compression spring in said channel intermediate said lug and said fixed member, said spring tending to hold said ratchet disk thrust into an advanced position permitting said key to occupy its advanced position, and a pivoted member normally abutting said ratchet disk and holding the latter in a retracted position against the tension of said spring for maintaining said key in retracted position, said pivoted member being manually shiftable to a position wherein said ratchet disk is released, allowing the same to be actuated by said spring to a position permitting the advance of said key.

In testimony whereof, I affix my signature in presence of two subscribing witnesses.

MARTIN L. HUNKER.

Witnesses:
  H. E. DUNLAP,
  W. B. WOOD.